United States Patent [19]

Hoffman et al.

[11] 4,217,267

[45] Aug. 12, 1980

[54] POLYMERIC PENTAERYTHRITYL PHOSPHONATES AND THEIR USE AS FLAME RETARDANTS

[75] Inventors: Joseph A. Hoffman, Bridgewater; Christos Savides, Piscataway; John C. Oppelt, Bridgewater, all of N.J.

[73] Assignee: American Cyanamid Company, Stamford, Conn.

[21] Appl. No.: 900,828

[22] Filed: Apr. 28, 1978

[51] Int. Cl.$^2$ ............................ C07F 9/40; C08K 5/53
[52] U.S. Cl. ...................... 260/45.75 D; 260/45.75 B; 260/45.75 F; 260/45.75 W; 260/45.8 R; 260/927 R
[58] Field of Search .............. 260/927 R, 969, 45.8 R, 260/45.75 B, 45.9 NP

[56] References Cited

U.S. PATENT DOCUMENTS

| | | | |
|---|---|---|---|
| 3,141,032 | 7/1964 | Friedman | 260/927 R |
| 3,257,355 | 6/1966 | Bean, Jr. | 260/927 R |
| 3,483,279 | 12/1969 | Davis et al. | 260/969 |
| 3,705,214 | 12/1972 | Martin | 260/969 |
| 3,839,506 | 10/1974 | Hechenbleikner et al. | 260/45.8 R |
| 3,978,166 | 8/1976 | Hechenbleikner | 260/927 R |

FOREIGN PATENT DOCUMENTS 2630693  2/1977  Fed. Rep. of Germany ...... 260/927 R

*Primary Examiner*—Anton H. Sutto
*Attorney, Agent, or Firm*—Bruce F. Jacobs

[57] ABSTRACT

Flame retardant polyolefin composições containing polymeric pentaerythrityl phosphonates and ammonium polyphosphate.

5 Claims, No Drawings

POLYMERIC PENTAERYTHRITYL PHOSPHONATES AND THEIR USE AS FLAME RETARDANTS

The present invention relates to novel polymeric pentaerythrityl phosphonates. More particularly, it relates to the use of the polymeric phosphonates as flame retardants for polyolefins, particularly polypropylene.

Dialkyl and certain diaryl pentaerythrityl diphosphonats are known; see Friedman, U.S. Pat. No. 3,141,032, and German Offenleg. No. 2,630,693. These compounds have been suggested as flame retardants for polyolefins and for aromatic polyesters. Polymeric phosphonates of the type:

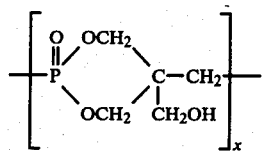

are disclosed by Heckenbleichner, U.S. Pat. No. 3,978,166. They are obtained by reacting pentaerythritol phosphite:

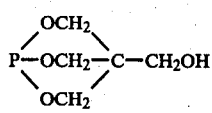

with a small amount of an alcohol ($C_1$-$C_4$, allyl, benzyl, or 2,3-dibromopropyl) or a diol of at least 2 carbon atoms. Reaction of a dialkyl pentaerythrityl diphosphite

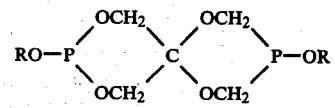

with a small amount of a diol, HO—R'—OH, is shown to form a cross-linked polymer represented by the structure:

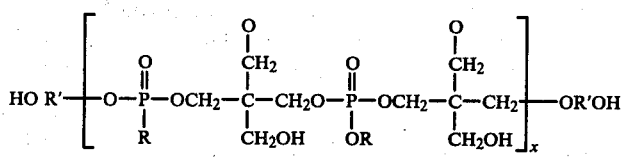

The present invention provides novel polymeric pentaerythrityl phosphonates represented by the structure:

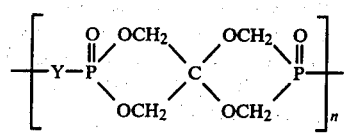

wherein Y is selected from

(a)

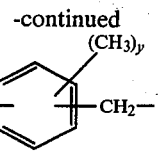

(b)

wherein n is at least 2; x is an integer from 1 to 8; and y is 0 to 4. The present invention also provides a method for the preparation of said polymers and flame retardant compositions containing them.

In general, the polymeric pentaerythrityl phosphonates of this invention may be prepared by reacting a dialkyl pentaerythrityl diphosphite, wherein the alkyl group has about 1-8 carbon atoms, e.g., diethyl pentaerythrityl diphosphite, with the appropriate $\alpha,\omega$-dihalide (bromide, chloride) under nitrogen at a temperature of about 80°-200° C. for about 1 to 20 hours. The molar ratio of phosphite to dihalide should be about 1.0–1.1/1. The reaction is readily conducted in the absence of a solvent; however, a solvent such as methylene chloride or o-dichlorobenzene may be used. The equation for the reaction is as follows:

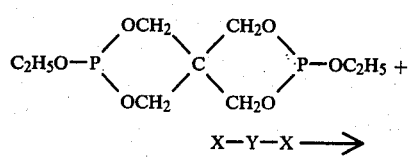

$$X-Y-X \longrightarrow$$

$$X = Br, Cl$$

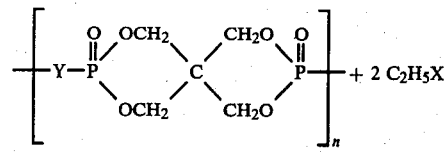

In addition to the polypentaerythrityl phosphonates, the flame retardant compositions of this invention may also contain ammonium polyphosphate. The ammonium polyphosphate compounds are known and may be prepared as exemplified in U.S. Pat. Nos. 3,423,343 and 3,513,114. They are generally substantially water insoluble and possess a plurality of P-O-P type linkages. They are available from Monsanto Chemical Co. under the tradename Phos-chek P/30.

The polypentaerythrityl phosphonate and the ammonium polyphosphate combination is useful as a flame retardant when incorporated into polyolefins, especially polypropylene, in a flame retarding amount, i.e., from about 20 to about 50 percent by weight, based on the weight of the polymer. The ratio of pentaerythrityl diphosphonate to ammonium polyphosphate should be such that at least about 25% of the mixture of flame retardants is the pentaerythrityl diphosphonate to provide self-extinguishing, nondripping formulations.

In order to further improve on the nondripping characteristics of the combination of polypentaerythrityl phosphonates and ammonium polyphosphate, it has been found that the addition of various oxides and/or carbonates provide optimum results.

The oxides or carbonates may be added to the polyolefin in amounts ranging from about 0.25 to 5 percent by weight, based on the weight of the polymer. Useful compounds include alkali metal carbonates, such as sodium carbonate, potassium carbonate, etc.; alkaline earth metal oxides, such as barium oxide, magnesium oxide, etc.; alkaline earth metal carbonates, such as magnesium carbonate, calcium carbonate, etc.; Group IV-A metal oxides, such as silicon dioxide, stannic oxide, etc.; titanium dioxide, zinc oxide, aluminum oxide, antimony oxide, and the like.

The flame retardant polyphosphonate, either alone or in combination as described, may be added to the polymer as such, or as individual components, by any known method, such as by milling the polymer and the components on, for example, a two-roll mill, in a Banbury mixer, etc., by molding the components and the polymer simultaneously, or by extruding the polymer and components, or by merely blending all the ingredients together in powder form and thereafter forming the desired ultimate product. Additionally, the flame retardant components or combination may be added during the production of the polymer, i.e., during polymerization, provided the catalyst, conditions, and other ingredients of the polymerization are inert thereto.

It is also within the scope of the invention to incorporate such ingredients as plasticizers, dyes, pigments, heat and light stabilizers, antioxidants, antistatic agents, photochromic materials, and the like, into the polymer composition.

EXAMPLE 1

Poly[3(-9)ethylene-2,4,8,10-tetraoxa-3,9-diphosphaspiro[5.5]undecane 3,9-dioxide] (Y=—(CH₂)₂—)

Diethyl pentaerythrityl diphosphite (1.1 mole) was reacted with 1.0 mole of 1,2-dibromoethane for 12 hours under a nitrogen atmosphere at 135° C. to give the polymeric phosphonate in 89 percent yield of a white powder; softening point 180°–190° C.

EXAMPLE 2

Poly[3(-9)n-propylene-2,4,8,10-tetraoxa-3,9-diphosphaspiro[5.5]undecane 3,9-dioxide] (Y=—(CH₂)₃—)

Following the procedure of Example 1, 1,3-dibromopropane (1.0 mole) was reacted at 140° C. for 12 hours to give the polymer in 90 percent yield; softening point 210° C.

EXAMPLE 3

Poly[3(-9)n-butylene-2,4,8,10-tetraoxa-3,9-diphosphaspiro[5.5]undecane 3,9-dioxide] (Y=—(CH₂)₄—)

Following the procedure of Example 1, 1,4-dibromobutane (1.0 mole) was reacted at 170° C. for 12 hours to give the polymer in 92 percent yield; softening point 140° C.

EXAMPLE 4

Poly[3(-9)n-hexylene-2,4,8,10-tetraoxa-3,9-diphosphaspiro[5.5]undecane 3,9-dioxide] (Y=—(CH₂)₆—)

Following the procedure of Example 1, 1,6-dibromohexane (1.0 mole) was reacted for 12 hours at 150° C. to give the polymer in 88 percent yield; softening point 160° C.

EXAMPLE 5

Poly[3(-9)buten-2-ylidene-2,4,8,10-tetraoxa-3,9-diphosphaspiro[5.5]undecane 3,9-dioxide]
(Y=—CH₂CH=CHCH₂—)

Following the procedure of Example 1, 1,4-dichloro-2-butene (1.0 mole) was reacted at 150° C. for 12 hours to give the polymer in 82 percent yield; softening point 150° C.

EXAMPLE 6

Poly[3(-9)-p-phenylenedimethylene-2,4,8,10-tetraoxa-3,9-diphosphaspiro[5.5]undecane-3,9-dioxide]

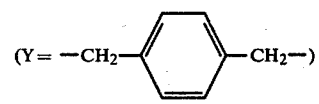

Diethyl pentaerythrityl diphosphite (1.1 moles) was reacted with α,α'-dichloro-p-xylene (1.0 mole) at 100° C. for 2 hours to give a white polymeric product in 91 percent yield; softening point >300° C.

EXAMPLE 7

Poly[3(-9)-2,5-dimethyl-p-phenylenedimethylene-2,4,8,10-tetraoxa-3,9-diphosphaspiro[5.5]undecane-3,9-dioxide]

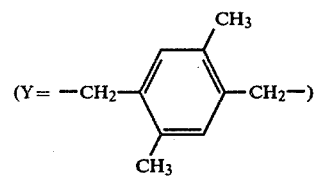

Following the procedure of Example 6, 2,5-dimethyl-αα'-dichloro-p-xylene (1.0 mole) was reacted for 2 hours at 150° C. to give a white powder in 74 percent yield; softening point >300° C.

EXAMPLE 8

Poly[3(-9)-2,3,5,6-tetramethyl-p-phenylenedimethylene-2,4,8,10-tetraoxa-3,9-diphosphaspiro[5.5]undecane-3,9-dioxide]

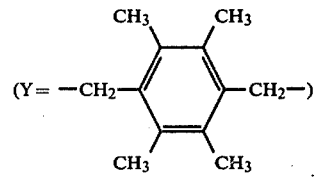

Diethyl pentaerythritol diphosphite (1.1 moles) was reacted with 2,3,5,6-tetramethyl-α,α'-dichloro-p-xylene (1.0 mole) in 250 ml. o-dichlorobenzene for 2 hours at 60° C. to give a white polymeric product in 77 percent yield; softening point >300° C.

EXAMPLE 9

A dry blend of polypropylene powder (PROFAX 6401, Hercules) containing the polyphosphonate of Example 6, alone and combined with ammonium polyphosphate, was extruded through a Melt Index Apparatus (described in ASTM D-1238) at 250° C. to give a cylindrical polymer sample 5 inches in length and 0.25 inch in diameter. The sample was subjected to the following flammability test methods.

A. Vertical Flammability Method: (described, in part, in Underwriters Laboratories Test UL94, Vertical Test Method 3.10–3.15, September, 1973)

Each sample, held in a vertical position, is ignited with a $\frac{3}{4}$ inch blue flame for 10 seconds. The test flame is withdrawn and the duration of the flaming before extinguishment is recorded. When flaming ceases, the test flame is again applied for 10 seconds. After removal of the second flame application, the flaming duration before extinguishment is again recorded. If the sample burns for more than 30 seconds after each application, it is considered to have failed the test.

The following are recorded: (a) duration of time to extinguishment (flaming) for each flame application, and (b) whether or not specimens dripped flaming particles which ignited a cotton swatch placed 12 inches below the specimen. Data are given in Table I.

TABLE 1

| Additive | Flammability Test Results | | |
|---|---|---|---|
| | Fails/ Passes | Total Time (seconds) to Extinguishment | Dripping |
| Control-None | Failed | >60 | — |
| 30% APP* | Failed | >60 | — |
| 30% Ex. 6 | Passed | 0 | None |
| 20% Ex. 6 + 10% APP | Passed | 0 | None |
| 15% Ex. 6 + 15% APP | Passed | 0 | None |
| 10% Ex. 6 + 20% APP | Passed | 0 | None |

*ammonium polyphosphate

B. Oxygen Index Method

The samples prepared in Example 9 (A) were tested according to the procedure of ASTM D-2863, paragraphs 8.1–8.11. The oxygen index values are given in Table II (the higher the O.I. number the better the flame retardancy).

Table II

| Oxygen Index Flammability Test | |
|---|---|
| Sample | Oxygen Index |
| Control | 17.5 |
| 30% APP | 20.1 |
| 30% Ex. 6 | 24.8 |
| 20% Ex. 6 + 10% APP | 28.3 |
| 15% Ex. 6 + 15% APP | 29.2 |
| 10% Ex. 6 + 20% APP | 29.0 |

EXAMPLE 10

Using the sample preparation technique and test methods of Example 9, the compound of Example 1 was evaluated, and gave the following results.

| A. Vertical Flammability Test Method | | | |
|---|---|---|---|
| Sample | Passes/ Fails | Total Time (seconds) to Extinguishment | Dripping |
| 30% Ex. 1 | Passed | 0 | Dripped |
| 20% Ex. 1 + 10% APP | Passed | 0 | None |
| 15% Ex. 1 + 15% APP | Passed | 0 | None |
| 10% Ex. 1 + 20% APP | Passed | 0 | None |

| B. Oxygen Index Flammability Test | |
|---|---|
| Sample | Oxygen Index |
| 30% Ex. 1 | 24.8 |
| 20% Ex. 1 + 10% APP | 28.1 |
| 15% Ex. 1 + 15% APP | 27.7 |
| 10% Ex. 1 + 20% APP | 26.5 |

EXAMPLES 11–15

The following polyphosphonates were evaluated in polypropylene using a formulation containing 12% flame retardant, 17% ammonium polyphosphate, and 1% titanium dioxide. The samples were prepared as described in Example 9 and tested according to the Vertical Flammability procedure described in Example 9A. Samples were rated as follows:

1. Sample burned for more than 30 seconds following each flame application: free burning (FB)
2. Sample with extinguishment time less than 20 seconds (total of two applications) and no dripping: V-0
3. Sample with extinguishment time less than 60 seconds (total of two applications) with dripping: V-2

Data are given in Table III.

TABLE III

| | Vertical Flammability Test Results | |
|---|---|---|
| Sample | Y | Rating |
| Ex. 2 | —(CH$_2$)$_3$— | V-0 |
| Ex. 3 | —(CH$_2$)$_4$— | V-0 |
| Ex. 4 | —(CH$_2$)$_6$— | V-0 |
| Ex. 7 | 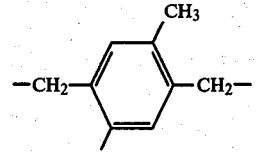 | V-0 |
| Ex. 8 | | V-0 |
| Ex. 5 | —CH$_2$—CH=CH—CH$_2$— | FB |

What is claimed is:

1. A flame retardant composition comprising a polyolefin polymer having about 2 to 4 carbon atoms and an effective flame retardant amount of a mixture of a polymeric pentaerythrityl phosphonate represented by the formula:

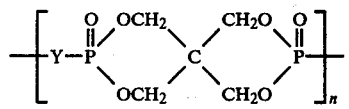

wherein Y is selected from (a) +CH$_2$+$_x$ or

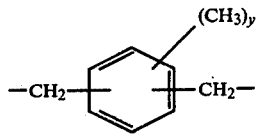 (b)

and wherein n is at least 2; x is an integer from 1 to 8; and y is 0 to 4, and ammonium polyphosphate.

2. The composition of claim 1 wherein said polyolefin is polypropylene.

3. The composition of claim 1 wherein the polymeric pentaerythrityl phosphonate is at least about 25% of the mixture of flame retardants.

4. The composition of claims 1, 2 or 3 further containing about 0.25 to 5 percent by weight, based on the weight of the polyolefin, of a material selected from the group consisting essentially of (1) an alkaline earth metal carbonate, (2) an alkaline earth metal oxide, (3) a Group IV-A metal oxide, (4) titanium dioxide, (5) zinc oxide, and (6) antimony oxide.

5. The composition of claims 1 or 3 further containing about 0.25 to 5 percent by weight, based on the weight of the polyolefin, of titanium dioxide.

* * * * *